United States Patent [19]

Clark et al.

[11] 4,273,505
[45] Jun. 16, 1981

[54] PNEUMATIC INFLATABLE END EFFECTOR

[75] Inventors: Keith H. Clark, Decatur; James D. Johnston, Madison, both of Ala.

[73] Assignee: The United States of America as represented by the Administrator of the National Aeronautics and Space Administration, Washington, D.C.

[21] Appl. No.: 945,044

[22] Filed: Sep. 22, 1978

[51] Int. Cl.³ .............................................. B25J 3/00
[52] U.S. Cl. ..................................... 414/735; 294/93; 414/4; 414/744 A
[58] Field of Search ............... 294/67 C, 86.24, 86.25, 294/86.28, 86.32, 93, DIG. 2; 414/729, 730, 732, 731, 733, 734, 735, 738, 744, 618, 225, 120, 71, 6, 7, 5, 4, 3, 2, 1

[56] References Cited

U.S. PATENT DOCUMENTS

| 3,255,893 | 6/1966 | Hainer et al. | 414/732 X |
| 3,268,091 | 8/1966 | Melton | 244/52 X |
| 3,327,450 | 6/1967 | Carter | 294/93 X |
| 3,347,587 | 10/1967 | Frost | 294/93 X |

Primary Examiner—Frank E. Werner
Attorney, Agent, or Firm—J. H. Beumer; J. R. Manning; L. D. Wofford

[57] ABSTRACT

The invention relates to an end effector device for a robot or teleoperated type space vehicle which includes an inflatable balloon member carried on the end of a tubular member which has a hollow center or conduit through which a suitable pressurized fluid is supplied. The device may be inserted into a variety of shaped openings or truss-type structures for handling in space.

5 Claims, 5 Drawing Figures

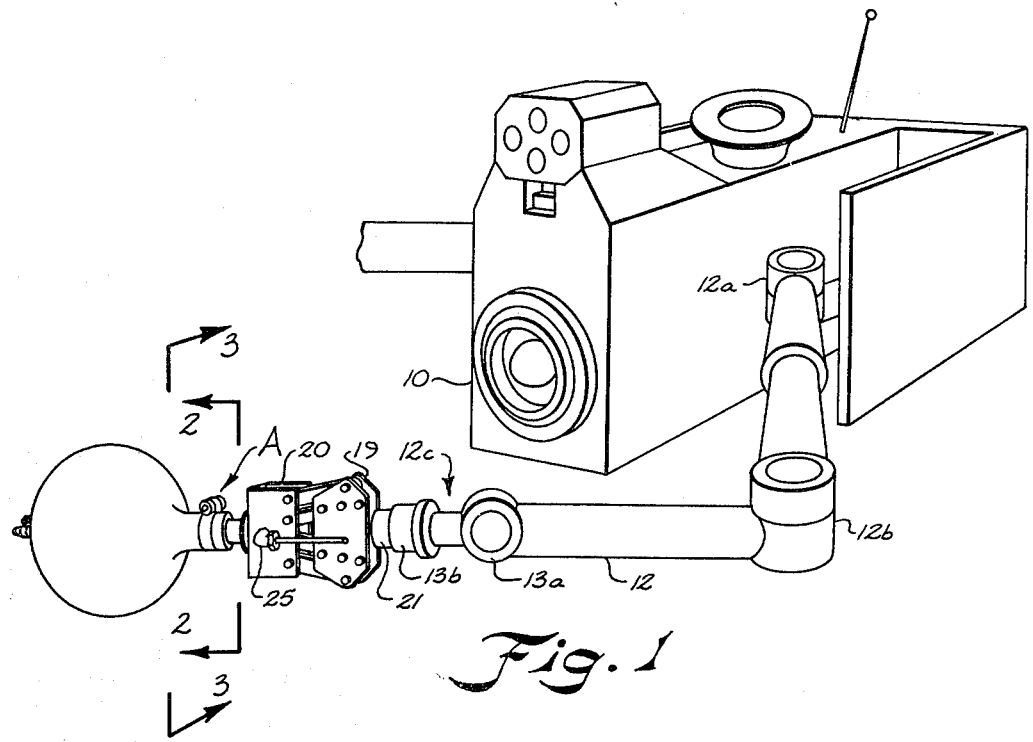
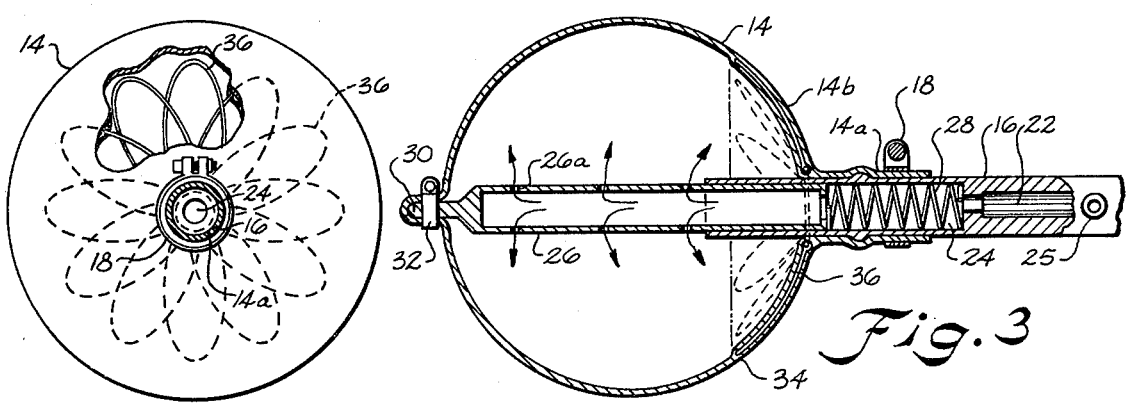
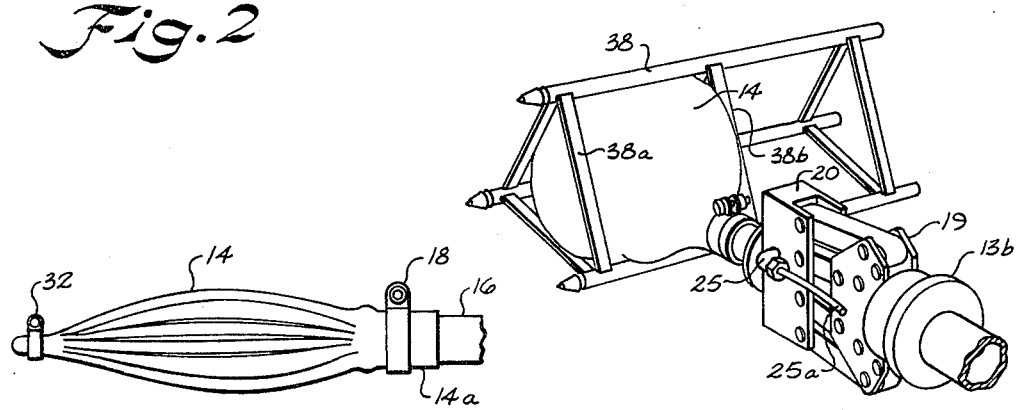

PNEUMATIC INFLATABLE END EFFECTOR

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates to a device for grasping an object from a remote location and, more particularly, to an end-effector device for the end of a remotely controlled mechanical manipulator arm of the type used in space exploration programs whereby an object may be grasped by insertion of the device into an open part of the object.

Prior devices have been developed for grasping objects and performing general work in space maneuvers which have typically included a set of opposed jaws or fingers which are movable towards and away from each other such as shown in U.S. Pat. Nos. 3,401,903 and 3,268,091. However, with the advent of the space shuttle and orbital laboratory-type programs, it has become necessary to work with thin frame structures which are fragile and may not be handled with jaw-type end-effector devices without substantial risk of damage.

It has also been known to pick up articles having an opening such as bottles with inflatable devices such as shown in U.S. Pat. Nos. 3,945,486 and 3,780,492. However, these devices do not readily lend themselves to the structures and problems involved in space applications.

SUMMARY OF THE INVENTION

It has been found that an end-effector device for a remote controlled manipulator arm of a space vehicle can be provided for grasping delicate thin truss-type structures avoiding damage thereto wherein the device includes a pneumatic inflatable member having an extendable spine member affording reinforcement for movement in the yaw and pitch directions while maintaining the device in a grasping configuration.

An important object of this invention is to provide an end-effector device which will grasp or hold thin truss-type frame structures which are utilized in space structures such as space platforms, antenna constructions, solar collectors, solar powered satellites, and the like.

Another important object of the present invention is to provide an inflatable end-effector device which can be used with thin truss-type frame space structures which are fragile without damaging the structures by crushing or other forceful engagement.

Another important object of the present invention is to provide an end-effector device which will fit a variety of object opening shapes.

Another important object of the present invention wherein an inflatable end device is provided which is resilient and highly forgiving when placed under strain by the object being grasped or held.

Another important object is to provide an end-effector device which is essentially self-centering such that it can be inserted into an opening at an angle and will generally assume the shape of the opening once it is inflated eliminating the need for precise alignment with the opening.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a teleoperator vehicle incorporating an end effector device constructed according to the invention;

FIG. 2 is a sectional view taken along line 2—2 at FIG. 1;

FIG. 3 is a partial sectional view taken along line 3—3 of FIG. 1;

FIG. 4 is an elevation of an end effector device according to the invention in a deflated condition; and FIG. 5 is a perspective view illustrating a thin truss-type frame being grasped by an end effector device according to the invention.

DESCRIPTION OF A PREFERRED EMBODIMENT

A pneumatic end-effector device, designated generally as A, is illustrated in connection with a teleoperated space vehicle 10 of the type having a mechanical manipulator arm 12 which includes a shoulder joint, designated generally as 12a, an elbow joint 12b, and a wrist joint, generally designated as 12c, which consists of cylindrical housings 13a and 13b having axes about which pitch and yaw rotational motion are produced, respectively. Further rotational motion may be produced about shoulder and elbow joints 12a and 12b all of which is typically produced by electric motors and mechanisms housed within the joints which are controlled through the teleoperator vehicle from a remote location to manipulate the end-effector A and an attached load during use. Since the details of the vehicle, manipulator arm, and control therefor form no part of the invention herein, such are omitted and reference may be had to U.S. Pat. No. 3,268,091 for more detail.

Referring now in more detail to the drawing, the pneumatic inflatable end effector A is illustrated as including a balloon means in the form of member 14 which is carried on the end of a tubular member 16 by means of a clamp 18 engaged around the circumference of the neck of the balloon 14a and the tubular member 16. The tubular member 16 may be connected to the manipulator arm through a conventional connector device 19 and an adapter member 20. The connector device 19 being carried by the manipulator wrist joint 12c of the mechanical manipulator arm by means of connector 21. Balloon member 14 may be provided by any suitable inflatable fabric or elastic-type material preferably in a pleated configuration.

The end-effector device includes a bore 22 terminating at an enlarged bore 24 which slidably receives a reciprocating spine member 26 having a plurality of openings 26a for communicating a suitable pressurized fluid to the interior of the ballon member 14 by way of the bores 24 and 22. Adapter member 20 is fitted with a coupling 25 which communicates with bores 22, 24 and the balloon interior for making connection with flexible tubing 25a communicating with the pressurized fluid source (not shown), any conventional controls may be provided to control the admission and venting of fluid.

Any suitable source of pressurized fluid such as air or water, in the case of underwater applications, may be utilized. It is preferred that the pressurizing system be a closed system so that in applications in space, no expulsion of the pressurized fluid occurs resulting in a reactionary movement.

A spring member 28 applies a light bias on the spine member 26 to the right to aid and accommodate the extension and retraction of the spine member 26 during inflation and deflation without the presence of slack. Adjacent the remote end of the spine member, a tip 30 is provided about which a clamp 32 clamps the balloon member 14 to the spine member. The spine member 26 provides rigidity to the inflatable end-effector device during pitch and yaw motions when the device is inserted within a receptacle and under load.

The base of the inflatable balloon 10 includes a stiffened portion at 34 in the form of wire leafs arranged in a kaleidoscopic pattern so that individual generally gore-shaped sections 36 are provided to accommodate the pleated configuration of the balloon member when inflated. The stiffened portion may be provided by wire or other suitable reinforcing material, or multiple fabric layers molded into the balloon fabric in the form illustrated or made integral with the fabric in any other manner. This stiffened portion 34 of the balloon member provides additional reinforcement of the balloon member under load in all three degrees of motion but primarily in the roll motion or twisting. In the alternative, an outer reinforcing sleeve such as resilient tubing may be clamped to the neck 14a of the balloon and may be split so as to allow outward flexing during inflation and reinforce the base section 14b of the balloon during use.

Furthermore, it may be desirable to key the spine member 26 with the bore 24 of the tubular member 12; or, in the alternative, a square or other spine member shape having pointed edges may be used to reduce the twisting or roll of the balloon and end-effector device under load.

In operation, the end effector is inserted in an opening in the object being grasped or handled by manipulating the arm 12. It is not necessary that the balloon 14 be inserted in any precise alignment with the hole or opening since upon inflation, the balloon will essentially assume the size and shape of the opening and will be self-centering or self-aligning. FIG. 5 illustrates a thin truss-type frame 38 with end-effector device A inserted in an opening between frame members 38a and 38b and inflated for grasping and handling the frame in space. Any force of the end-effector device against the frame will be absorbed by the resiliency of the balloon which is highly yielding and forgiving, avoiding crushing or any other damage to the frame.

Thus, it can be seen that an advantageous construction can be had for an end effector for manipulative and docking devices for space, defense, and industrial use which provides a means for capturing, holding, handling and maneuvering objects of various sizes and shapes such as satellites, payloads, structural members and the like. Particularly, delicate frame structures may be advantageously handled in a positive gripping manner without risk of damage which often accompanies the use of conventional end-effector arrangements such as jaws which, even with the use of extra-sensory feedback information from the end-effector, are not reliably effective in avoiding crushing and damage of the delicate frame structures.

While a preferred embodiment of the invention has been described using specific terms, such description is for illustrative purposes only, and it is to be understood that changes and variations may be made without departing from the spirit or scope of the following claims.

What is claimed is:

1. In the combination of a remote controlled manipulator arm and an end-effector device of the type used on space vehicles and the like for carrying out maneuvers by inserting said end-effector device into an opening in an object being grasped, wherein said end-effector device comprises:

a tubular member;

means for adapting said tubular member to said manipulator arm;

inflatable balloon means carried by one end of said tubular member expandable into a general shape for occupying said opening of said object;

a hollow bore formed within said tubular member;

means for connecting said hollow bore to a source of pressurized fluid;

an elongated spine member carried by said tubular member in a cantilevered manner extending past said one end of said tubular member and having a distal end attached to said balloon means affording rigidity to said balloon means when inflated and during manipulation of said object;

said spine member being slidably carried by said tubular member to variably project and retract relative to said tubular member for accomodating the inflation and deflation of said balloon means;

reinforcing means carried in contact with a base portion of said balloon means for stiffening said base portion when inflated affording reinforcement under load to provide a degree of rigidity to said balloon means when undergoing motion about the axis of said tubular member;

a central bore formed in said spine member communicating with said hollow bore of said tubular member; and a plurality of openings formed in the exterior of said spine member communicating said central bore with the interior of said balloon means by which said balloon means may be selectively inflated and deflated.

2. The device of claim 1 including wire stiffening means carried by a base portion of said balloon means arranged in a general kaleidoscopic pattern affording reinforcement to said balloon means under load.

3. The device of claim 2 wherein said wire stiffening means is embedded in the fabric of said balloon means.

4. The device of claim 1 wherein said spine member is received within said hollow bore of said tubular member.

5. The device of claim 4 including biasing means carried in said hollow bore in engagement with an end of said spine member accommodating extension and retraction of said spine member without slack.

* * * * *